United States Patent
Moore

(10) Patent No.: US 7,206,367 B1
(45) Date of Patent: Apr. 17, 2007

(54) APPARATUS AND METHOD TO SYNCHRONIZE MULTIMEDIA PLAYBACK OVER A NETWORK USING OUT-OF-BAND SIGNALING

(75) Inventor: Daniel L Moore, Vancouver, WA (US)

(73) Assignee: Sigmatel, Inc., Austin, TX (US)

( * ) Notice: Subject to any disclaimer, the term of this patent is extended or adjusted under 35 U.S.C. 154(b) by 876 days.

(21) Appl. No.: 09/903,040

(22) Filed: Jul. 10, 2001

(51) Int. Cl.
H04L 7/00 (2006.01)
H04N 9/475 (2006.01)

(52) U.S. Cl. .................... 375/354; 348/515

(58) Field of Classification Search ............ 375/354, 375/356, 366; 370/538; 709/249, 250; 713/500, 713/501, 502; 348/515
See application file for complete search history.

(56) References Cited

U.S. PATENT DOCUMENTS

| | | | | |
|---|---|---|---|---|
| 3,618,037 A | * | 11/1971 | Wollum et al. ............ 713/501 |
| 5,051,993 A | * | 9/1991 | DeLuca et al. ............ 370/310 |
| 5,703,877 A | * | 12/1997 | Nuber et al. .......... 370/395.64 |
| 5,784,597 A | * | 7/1998 | Chiu et al. ................. 713/401 |
| 5,889,515 A | * | 3/1999 | McDade et al. ......... 715/500.1 |
| 6,269,122 B1 | * | 7/2001 | Prasad et al. .......... 375/240.28 |
| 6,452,974 B1 | * | 9/2002 | Menon et al. ......... 375/240.28 |
| 6,549,544 B1 | * | 4/2003 | Kroeger et al. ............ 370/482 |
| 6,691,310 B2 | * | 2/2004 | Hirasawa et al. ............. 725/25 |
| 6,721,798 B1 | * | 4/2004 | Kubista ....................... 709/236 |
| 6,763,241 B2 | * | 7/2004 | Gous et al. .................. 455/502 |
| 6,834,091 B2 | * | 12/2004 | Litwin et al. ............... 375/356 |
| 6,888,819 B1 | * | 5/2005 | Mushkin et al. ............ 370/350 |
| 6,914,914 B1 | * | 7/2005 | Flood et al. ................. 370/503 |
| 2001/0006525 A1 | * | 7/2001 | Mizuguchi et al. ......... 370/538 |
| 2002/0091861 A1 | * | 7/2002 | Kim et al. ................... 709/249 |
| 2002/0098798 A1 | * | 7/2002 | Solum et al. .............. 455/3.01 |
| 2002/0184637 A1 | * | 12/2002 | Perlman ....................... 725/87 |

FOREIGN PATENT DOCUMENTS

GB 2373692 A * 9/2002

OTHER PUBLICATIONS

Mazzali et al., Optical PPM Generator by Direct-Frequency Shifting, 1998. Feb. 22-27, 1998, OFC '98., Technical Digest, pp. 191-192.*

* cited by examiner

Primary Examiner—Emmanuel Bayard
Assistant Examiner—Lawrence Williams
(74) Attorney, Agent, or Firm—Toler Schaffer, LLP

(57) ABSTRACT

An apparatus and method to synchronize devices in a network to a sub-millisecond timing accuracy. In a first embodiment, the transmission of data is synchronized between a first source device and destination devices communicatively coupled to a network. In a second embodiment, data is deterministically transmitted between a first source device and destination devices communicatively coupled to a network. In a third embodiment, a deterministic network synchronizes the transmission of data between a first source device and destination devices coupled to a network.

51 Claims, 9 Drawing Sheets

APPARATUS AND METHOD TO SYNCHRONIZE MULTIMEDIA PLAYBACK OVER A NETWORK USING OUT-OF-BAND SIGNALING

BACKGROUND OF THE INVENTION

1. Field of the Invention

This invention relates generally to network interconnection of multiple electronic and consumer devices, and in particular to network interconnection for synchronized transmission of digital media to multiple devices.

2. Description of Related Art

Interconnecting Devices for Distribution of Audio, Telephone, Video, and Other Media Data Conventional networking technology has not achieved practical home networking of consumer electronic devices. One fundamental obstacle to such networking is the difficulty of interconnecting various types of consumer electronics devices within a single room, or throughout an entire home or other environment, such as a hotel, apartment building, car, boat, or recreational vehicle. Moreover, when such devices are interconnected, there remain problems in distributing audio, video, and other types of media/data, in a sufficiently synchronized manner.

The advent of digital media and services (e.g., audio compact disks (CDs), direct satellite service (DSS) or digital video broadcast (DVB) from digital satellite broadcasts, and digital video disk (DVD) movies) increases the need for a synchronized network solution. Current systems for interconnecting consumer electronics and other devices have inadequate media synchronization, which is problematic. Synchronization is a major problem since delays among different devices in receiving media data can be on the order of hundreds of milliseconds, thereby resulting in distorted playback of content.

A particularly important network parameter is the reliability of on-time delivery of time-sensitive data, sometimes called "quality of service." Quality of service in many prior-art networks is low, because many network protocols are collision-based (i.e., there is no handshaking or allocation of network resources between devices to preclude the need for repeat transmissions of time-sensitive data on congested networks). Audio, telephone, video, and other media are examples relying on the use of time-sensitive data, and any network to distribute time-sensitive data must have a high quality of service in order to be practical. The timing of media data, such as audio data, needs to be accurate to much less than one millisecond to avoid annoying phase and time synchronization problems between different audio speakers, or between audio speakers and video systems.

For example, speakers designed to play over a network connection (e.g., HomePlug, HomePNA, Ethernet, wireless, or equivalents) have a major problem with synchronization of playback. Traditionally, speakers are connected directly to an amplifier, which drives all of the speakers in the room. As long as the polarity of the connection to each speaker is correct, the amplifier controls the phase of the output from the speakers. This is possible, since there is effectively no latency from the time the amplifier produces a signal on the speaker wire to the time that signal arrives at the speaker. This is not true for networked speakers, due to a variable latency in the transmission of the audio data from the audio controller (the network stereo equivalent to a pre-amplifier/controller) to the speakers.

Variable latency causes the phase of the playback of the audio data to be different for each speaker in the system. One noticeable result of the phase difference is the degradation of the "surround sound" effects that consumers desire in a home theater system. Variable latency will also degrade stereo separation in a two-speaker configuration. Since home stereos are beginning to support 24-bit pulse code modulation (PCM) with a 96-kilohertz (kHz) sampling rate, improved synchronization will be needed to maintain acceptable playback quality.

One goal of networked speakers is to eliminate the speaker wires connecting each speaker to the central amplifier. Instead, each speaker has an internal amplifier and a network connection. If this network connection is power line based (e.g., HomePlug or HomePNA), then only a single connection to the speaker is required. Furthermore, most homes have many power outlets, making it easy to locate the speakers as needed.

Conventional methods attempt to minimize synchronization errors between networked speakers. One conventional method uses multicast transmission synchronized to the time of the first packet transmission. Another conventional method uses a network time protocol (NTP). Yet, both methods are problematic for the reasons discussed below.

The first method, multicast transmission, entails synchronizing playback of the audio content to the starting packet and is the simplest method. A controller uses multicast transmissions of packets, wherein each packet contains data for all the channels in the system. Each speaker starts playback with the first packet, and packets that are additionally received are buffered until the playback of earlier packets is completed. This method is relatively simple since it only requires a network interface card (NIC), a digital-to-analog (D/A) converter, and an amplifier in each speaker. However, this method has several problems. It requires that the clocks in all of the speakers be very accurate, or else the timing of the speakers will drift apart. If a speaker loses the network connection (e.g., is accidentally unplugged for an instant), the speaker will lose synchronization. HomePNA and some HomePlug proposals have link layer protocols (e.g., LARQ) that can cause variability in the arrival time of the initial packet. Therefore, although network synchronization is simple to implement by using the arrival time of the first packet, the multicast transmission method is not practical for high quality playback.

The second method, NTP, attempts to synchronize the clocks on the speakers and on the controller. NTP is a standard network protocol used to synchronize computer clocks to Universal Standard Time (UST); and is very accurate for time keeping, since clocks on computers coupled in a local area network (LAN) may be synchronized to about one millisecond accuracy. Unfortunately, such synchronization is not accurate enough for audio samples based on 24-bit samples taken with 96 kHz sampling rates. For example, transmission of 96 kHz audio samples would require about two orders of magnitude better speaker synchronization accuracy (i.e., $1/96,000$ second or better).

Home Multimedia Networks

Current home multimedia networks (e.g., home theater systems) illustrate many of the fundamental problems discussed above. For example, home theater systems effectively are limited to a single room in a house, primarily due to the difficulty and expense of interconnecting devices. Each source device, such as a satellite receiver, VCR, laserdisc, or DVD player, typically is connected, by audio and video cables, to a "central" preamplifier or other form of switching device, which is also connected to a main television/monitor as well as to one or more power amplifiers. These power amplifiers are also connected to various speakers throughout the room by dedicated speaker cables.

Current conventional attempts to address the multi-room problem (i.e., "home multimedia networks") exhibit a number of fundamental design flaws. For example, virtually all prior-art home network standards (e.g., X10, CEBus, Echelon LONWorks, and so forth) emphasize distribution of control information, but not audio, telephone, video, and other media. In other words, such systems distribute analog media on one network or wiring infrastructure, and distribute digital control information on another separate network. Custom installation of dedicated audio, telephone, video, and speaker cables throughout a home is required, often is prohibitively expensive, and results in relatively poor quality due to the degradation of analog signals propagating through multiple devices and extremely long cable runs.

The quality of such home automation networks is far below audiophile and videophile standards. Analog audio and video signals simply cannot propagate for long distances, and through multiple analog-to-digital (A/D) and digital-to-analog (D/A) converters and other analog processing circuitry, without suffering significant degradation in quality. Transmitting multiple audio/video channels over coaxial cables, power lines, or via radio frequency (RF) transmissions, degrades the signals significantly and results in relatively low-quality audio and video output.

Although some systems utilize existing unshielded twisted pair (UTP) telephone wiring to carry analog audio and video signals, the analog modulation of source audio and video signals over UTP cables also produces relatively low-quality audio and video output. Moreover, such systems still require custom installation of such UTP cabling. As a result, the expense and complexity of such systems increases exponentially compared with single-room home theater systems.

Local Area Networks and the Ethernet

One potential solution to the problems noted above is to implement a digital computer-based network of the type typically found in business environments for inter-connecting personal computers, workstations, servers, and printers. Although the recent popularity of the home computer market has led to a great deal of discussion of home networks, which merge general-purpose computing functionality with the consumer electronics devices found in home theaters, the solutions offered thus far have not advanced beyond the proposal stage.

Applying local area network technology (e.g., the Ethernet network protocol and the transmission control protocol/Internet protocol {TCP/IP}) to consumer electronics devices raises a number of problems. Although it appears advantageous to connect consumer electronics devices as generic nodes on a network, existing network protocols are not optimized for real-time streams of digital audio and video.

Conventional "solutions" typically fall into one of two categories. The first is analogous to the home automation networks discussed above, in which consumer electronics devices are connected via dedicated audio and video cables, and still transmit analog information along one network, while an Ethernet network, for example, enables home computers and other control devices to control the operation of the consumer electronics devices.

The other alternative implementation is to distribute audio, telephone, video, and other real-time media streams in digital form. There are a number of obstacles to this scenario, however, not the least of which is the absence of an existing physical and logical infrastructure to carry the digital media streams. The Ethernet, for example, is not optimized to carry real-time continuous digital media streams. It is an asynchronous, packet-based protocol that would add significant overhead to digital audio and video samples, which require consistent and timely delivery, as opposed to the ability to send "burst" packets of information at high speeds on demand.

Several known standard audio transfer file formats attempt to synchronize audio streams as used in the field of stereo equipment. For example, S/PDIF (Sony/Phillips Digital Interface) is typically used with digital audio equipment to enable the transfer of audio (e.g., over coaxial cable) from one file to another and the synchronization of audio streams. Also, TOSLINK (Toshiba Link) allows the synchronization of audio streams over fiber optic cables for stereo equipment. However, both are unsatisfactory solutions as they provide unidirectional data flow, and are unable to handle control signal transmissions.

Synchronous Networks

Synchronous network protocols (as discussed below) have not been optimized or adapted for popular use with consumer electronics devices to enable the practical distribution of digital media. For example, time-division multiplexed access (TDMA) networks utilize time-division multiplexing, and synchronize all devices to a master clock. However, the bandwidth on a TDMA network is typically divided equally amongst the devices on the network. In other words, if ten devices are on the network, each device gets one tenth of the network bandwidth, and thus can transmit information only during that channel or "time slice" (e.g., during one unit of every ten units of time). While some TDMA systems can allocate multiple time slots for higher bandwidth devices, TDMA is generally an insufficient alternative because in the context of transmitting digital media streams, certain data streams require more bandwidth than others. For example, video data requires more data than audio data, though sampled less frequently. Yet, TDMA networks assign each device a single channel in which to transmit all of its data. These channels are based simply on the number of devices on the network, and bear no relationship to the bandwidth requirements of the type of data being transmitted. This problem is exacerbated when asynchronously distributed variable bit-rate data, such as MPEG2 compressed video, needs to be accommodated. TDMA network technology provides no solution to either of these problems.

Even in the context of a ring network, in which data propagates from one device to another around a loop or ring (and is overwritten when a device desires to insert its own data), a device on a TDMA network could transmit information (such as a digital audio sample) anytime during its assigned time slice. Moreover, that time slice might change whenever a new device is added to or removed from the network. Thus, a device cannot guarantee consistent delivery of particular data, despite the synchronous nature of TDMA.

Fiber distributed data interface (FDDI) networks transmit information synchronously only in a point-to-point manner. In other words, the transmitter on one device is synchronized to the receiver on the next device on the ring, but the transmitter and receiver within a device are not synchronized to each other. Therefore, information will not always propagate through a device at a consistent rate, due to the difference between the transmit oscillator and receive oscillator within a device, among other factors. FDDI devices compensate for this difference with an "elasticity buffer" which avoids losing data, but this does not guarantee consistent delivery of data. For example, if a device receives data "late," it will transmit that data late. If it receives data "early," it will place that data in its elasticity buffer, and transmit such data in a first-in-first-out (FIFO) fashion. Thus, FDDI devices also cannot guarantee consistent delivery of data such as real-time continuous digital media streams. They are optimized for high throughput, but not for consistent, synchronous delivery of data. When FDDI is implemented using a LAN system (e.g., token ring access methods), FDDI is operable when a loop exits. Since breaking the loop interrupts the network, this technique of using FDDI falls short of providing a synchronous network.

Furthermore, both TDMA and FDDI systems do not transmit bi-directional data over a single pair of wires. This means that multiple pairs of wire must be run between devices, or the network must always be wired in a physical loop configuration.

Additionally, the IEEE 1394 high-speed serial bus works well with USB by providing enhanced PC connectivity for a variety of devices, including consumer electronics audio/video (A/V) appliances, storage peripherals, other PCs, and portable devices. Several examples of the IEEE 1394 standard include FireWire from Apple Computer, and iLink from the Sony Corporation. Although many peripheral devices, as well as stereos and televisions, have adopted this standard for communication over bi-directional high speed networks including access to CE equipment (devices), these IEEE 1394 implementations nevertheless fail to include the transmission of time synchronization signals. This is problematic as synchronization issues are left to the individual devices.

The above description of home theater systems and home automation networks, and of various existing asynchronous and synchronous network protocols, illustrates many of the obstacles to interconnecting consumer electronics devices for distribution of audio, telephone, video, and other real-time continuous digital media streams throughout a home or other environment. These obstacles must be resolved before home networks can achieve widespread acceptance. What is needed is a network that can accommodate real-time continuous digital media streams (e.g., digitized audio, video, and telephone). To do so, the network should deliver digital media streams reliably with a high quality of service, in order to provide the same level of synchronization as is currently provided by existing analog delivery mechanisms.

SUMMARY OF THE INVENTION

The present invention provides a network that can accommodate real-time continuous digital media (e.g., digitized audio, telephone, and video). The invention can be implemented in numerous ways, such as a method, a system, an apparatus, and a program on electronic-readable media. Several aspects of the invention are described below.

In accordance with a first aspect of the present invention, a method is provided to synchronize the transmission of a plurality of data between a first source device and one or more destination devices. The method includes transmitting the data in a first frequency band from the first source device; receiving the data into a buffer at the destination devices; transmitting a plurality of synchronization pulses in a second frequency band from a second source device; receiving the plurality of synchronization pulses at the destination devices; and receiving a sequence number at the destination devices to determine when the destination devices will access the data from the buffer.

In accordance with a second aspect of the invention, a method is provided to deterministically transmit data between a first source device and one or more destination devices. The method includes transmitting the data in a first frequency band from the first source device; receiving the data into a buffer at the destination devices; transmitting a plurality of synchronization pulses in a second frequency band from a second source device; receiving the plurality of synchronization pulses at the destination devices, wherein the plurality of synchronization pulses adjusts a local clock in each of the destination devices; and extracting a sequence number from the plurality of synchronization pulses received by the destination devices to determine when and in which order the destination devices will access the data from the corresponding buffer.

In accordance with a third aspect of the invention, a deterministic network is provided to synchronize transmission of a plurality of data between a first source device and one or more destination devices. The network includes a first source device to transmit data; a second source device to transmit a plurality of synchronization pulses; a destination device to receive the plurality of synchronization pulses, with a buffer to receive the data, and a controller to calculate a sequence number to determine when the controller will access the data from the buffer; a first transmission medium to transmit the data in a first frequency band from the first source device to the destination devices; a second transmission medium to transmit the plurality of synchronization pulses in a second frequency band from the second source device to the destination devices.

These and other objects and advantages of the invention will become apparent to those skilled in the art from the following detailed description of the invention, the appended claims, the abstract, and the accompanying drawings.

BRIEF DESCRIPTION OF THE DRAWINGS

The foregoing and other objectives, aspects, and advantages will be better understood from the following detailed description of embodiments of the present invention with reference to the following drawings.

Advantages of the invention will be set forth in part in the description which follows and in part will be apparent from the description or may be learned by practice of the invention. The object and advantages of the invention will be realized and attained by means of the elements and combinations particularly pointed out in the appended claims and equivalents.

DETAILED DESCRIPTION OF THE PREFERRED EMBODIMENTS

Advantages of the invention will be set forth in part in the description which follows and in part will be apparent from the description or may be learned by practice of the invention. The object and advantages of the invention will be realized and attained by means of the elements and combinations particularly pointed out in the appended claims and equivalents.

Reference will now be made in detail to several described embodiments of the present invention, examples of which are illustrated in the accompanying drawings. Wherever practicable, the same reference numbers will be used throughout the drawings to refer to the same or like parts.

Figure 1:
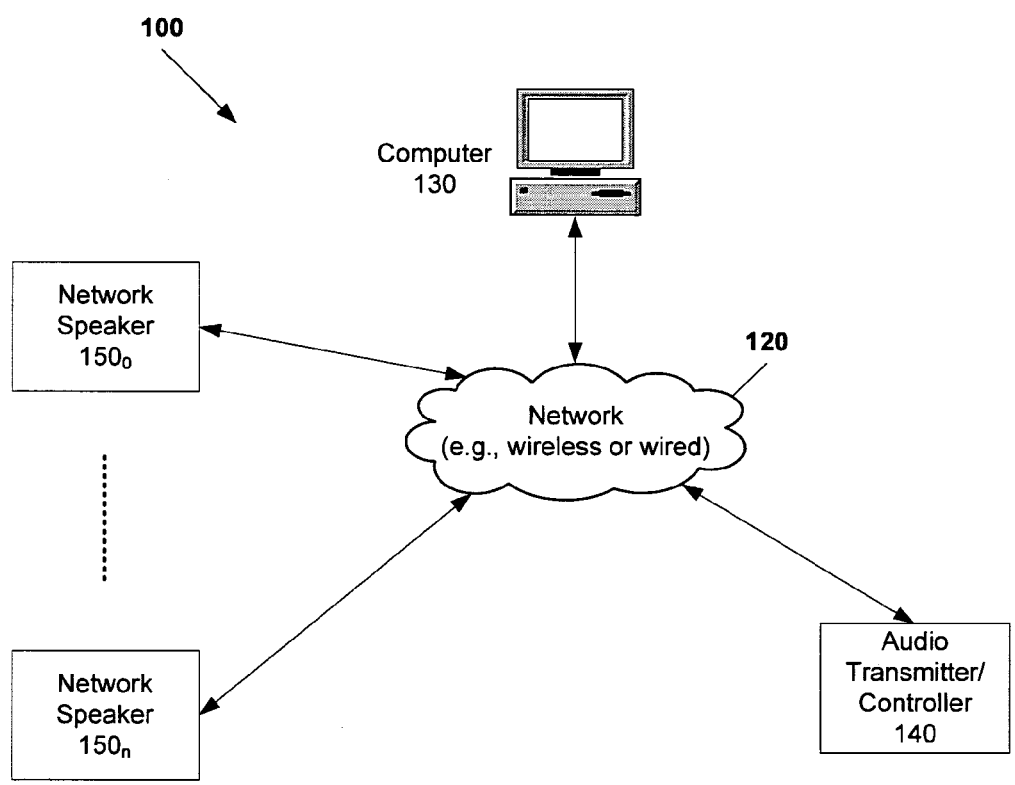
FIG. 1 illustrates a diagram of a system of networked speakers in accordance with the present invention.

FIG. 1 illustrates a diagram of a system 100 in accordance with one embodiment of the present invention. System 100 comprises a communications network 120, a computer 130 (optional), an audio transmitter/controller 140, and a plurality of network devices $150_{0-n}$, in the nature of network speakers $150_{0-n}$. The network 120 in one embodiment is implemented by utilizing the power line wiring inside a building (e.g., a home or an office) to transmit data and time synchronization information through the wall receptacles. Using this implementation, the data source device 140 and destination devices $150_{0-n}$ are connected by wires (e.g., power lines, telephone lines, and so forth) within the building (e.g., a home or an office). It is noted that the frequency of data transmission in the building would depend on the network technology used in the building (e.g., HomePNA, HomePlug, and so forth). In alternative embodiments, other types of network connections inside the building can be used (e.g., telephone wiring, dedicated wiring, optical cabling, infrared links, radio-frequency links, and so forth). It is noted that wireless links are well suited to work with present invention, that is, if modification is made to include the appropriate wireless interfaces known in the industry as substitutes for hard-wired communication links.

Furthermore, it will be appreciated by those skilled in the art that the present invention works suitably well with a wide variety of computer networks over numerous topologies, so long as network 120 connects the distributed network speakers $150_{0-n}$ to controller 140. For example, other public or private communication networks that can be used for network 120 include Local Area Networks (LANs), Wide Area Networks (WANs), intranets, and Virtual Private Networks (VPNs). Generally and although not shown explicitly, these types of communication networks can in turn be communicatively coupled to other networks comprising storage devices, server computers, databases, and client computers that are communicatively coupled to other computers and storage devices.

Network 120 enables the communication between multiple components of servers and other devices, which may or may not be co-located, but may be distributed for convenience, security, or other reasons. To facilitate the communication between client computers and a server, a client-server computer network operating system (NOS), which is an operating system used to manage network resources, can be used in conjunction with the present invention. A NOS can manage multiple inputs and requests concurrently and may provide the security necessary in a multi-user environment. An example of a NOS includes Windows NT manufactured by the Microsoft Corporation of Redmond, Wash. Other operating systems that are applicable include Windows 2000, Unix, Sun Microsystems's Solaris, and Novell Netware.

Computer 130, controller 140, and network speakers $150_{0-n}$, of system 100 or an arrangement of controller 140 and network speakers $150_{0-n}$ may beneficially utilize the present invention, and may contain an embodiment of the process steps and modules of the present invention in the form of a computer program. Alternatively, the process steps and modules of the present invention could be embodied in firmware or hardware, and when embodied in software, could be downloaded to reside on and be operated from different platforms used by real-time network operating systems. In those implementations where computer 130 is not utilized, the present invention works suitably well with the audio controller and the network speakers performing the processes described herein.

In the described embodiments, data is transmitted in one frequency band from a data source device to one or more destination devices, and the synchronization information is transmitted in a second frequency band to the destination devices from either the data source device or a separate synchronization device. Synchronization using out-of-band signaling over the network 120 comprises the transmission of a time synchronization pulse outside of the normal band used for network data communications. For example, on a power-line network this signal is more preferably transmitted at a higher frequency than the band used for the network data. Alternatively, the time synchronization signal can be transmitted at a lower frequency band than that used to transmit network data. It is noted that the exact frequency would also depend on what home network technology is used (e.g., HomePNA or HomePlug).

Alternative embodiments of the invention can be implemented with devices 140 and 150 that are other than consumer electronics devices (e.g., business devices, industrial devices, professional devices, and so forth) and in environments other than a home (e.g., offices, hotels, apartment buildings, cars, boats, recreational vehicles, and so forth). The particular environment or application may result in a significantly different configuration than the configurations illustrated below. The advantages of the embodiments of the invention described below with reference to a network of consumer electronics devices in a home also apply to these other environments and applications.

Figure 2A:
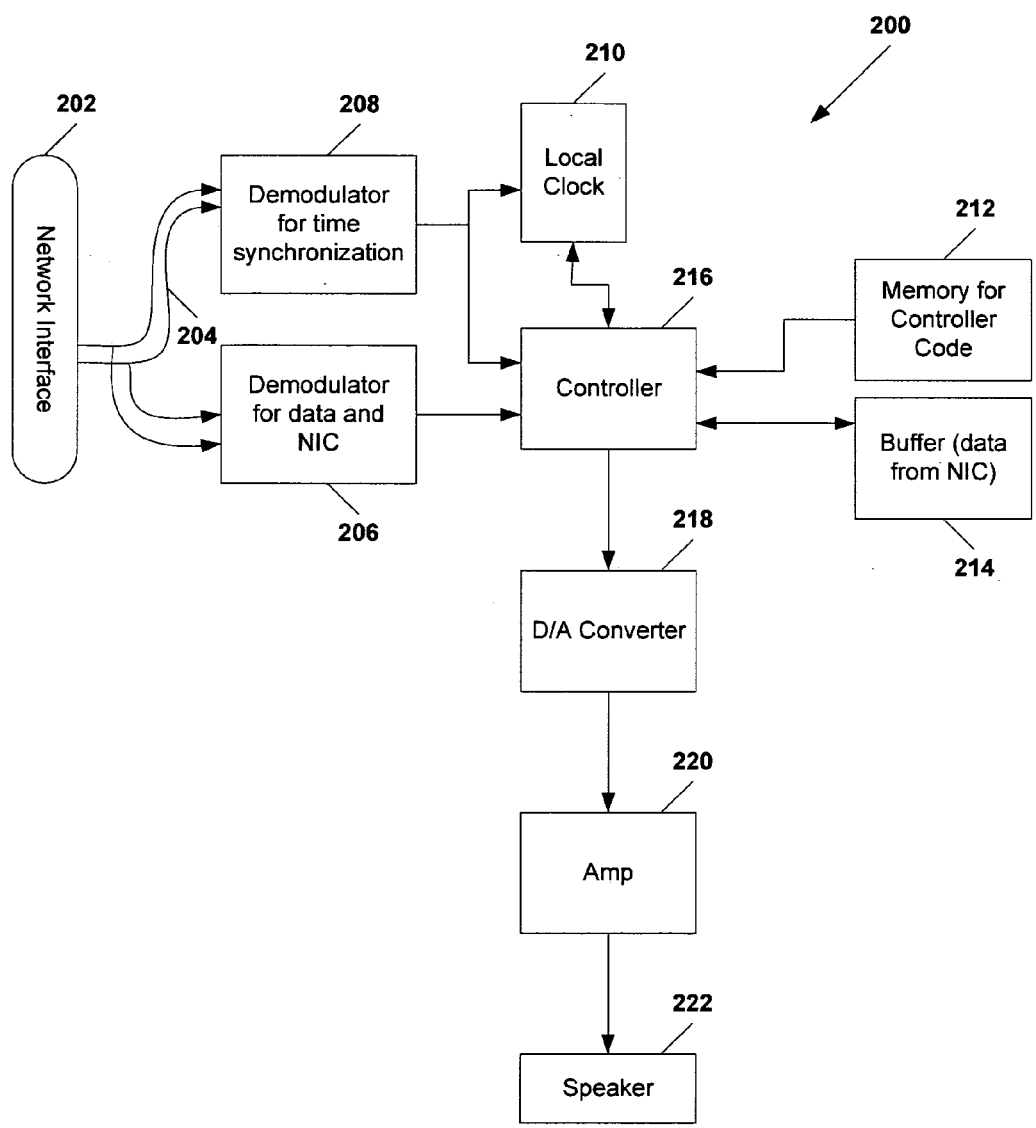
FIG. 2A illustrates a block diagram for one embodiment of a destination device with a local clock.

FIG. 2A illustrates a block diagram of one embodiment of a destination device 200 in accordance with the present invention. In the embodiment shown, destination device 200 is the network speaker $150_{0-n}$. The destination device 200 is connected to other network devices by network wiring 202 (e.g., a wall receptacle, if the network wiring is through the power line wiring of the building) communicatively coupled to network 120. The line 204 transmits the data received from network 120 to a demodulator and network interface card (NIC) 206. Additionally, line 204 forwards the time synchronization signals received from network 120 to a demodulator 208. The time synchronization signals are inputs to a local clock 210 and a controller 216. The local clock 210 in one embodiment is a phase-locked-loop (PLL), but can implemented in other types of clock sources, including a clock on-chip with the controller 216. For example, in an alternative embodiment shown in FIG. 2B, the local clock 210 can be replaced with a global positioning satellite (GPS) receiver 211, functioning as a source of time data for the controller 216. The controller 216 also receives the demodulated data from the demodulator and NIC 206. The controller 216 accesses a memory 212 with the controller instruction code, and a buffer 214 for the data produced by the demodulator and NIC 206. Memory 212 may be, for example, a ROM, RAM, hard disk, disk drive, or other static memory device. The controller 216 outputs multimedia data (e.g., audio data, video data, and so forth) to a digital-to-analog (D/A) converter 218, which produces an input for an amplifier 220 to send to a speaker 222.

Figure 2B:
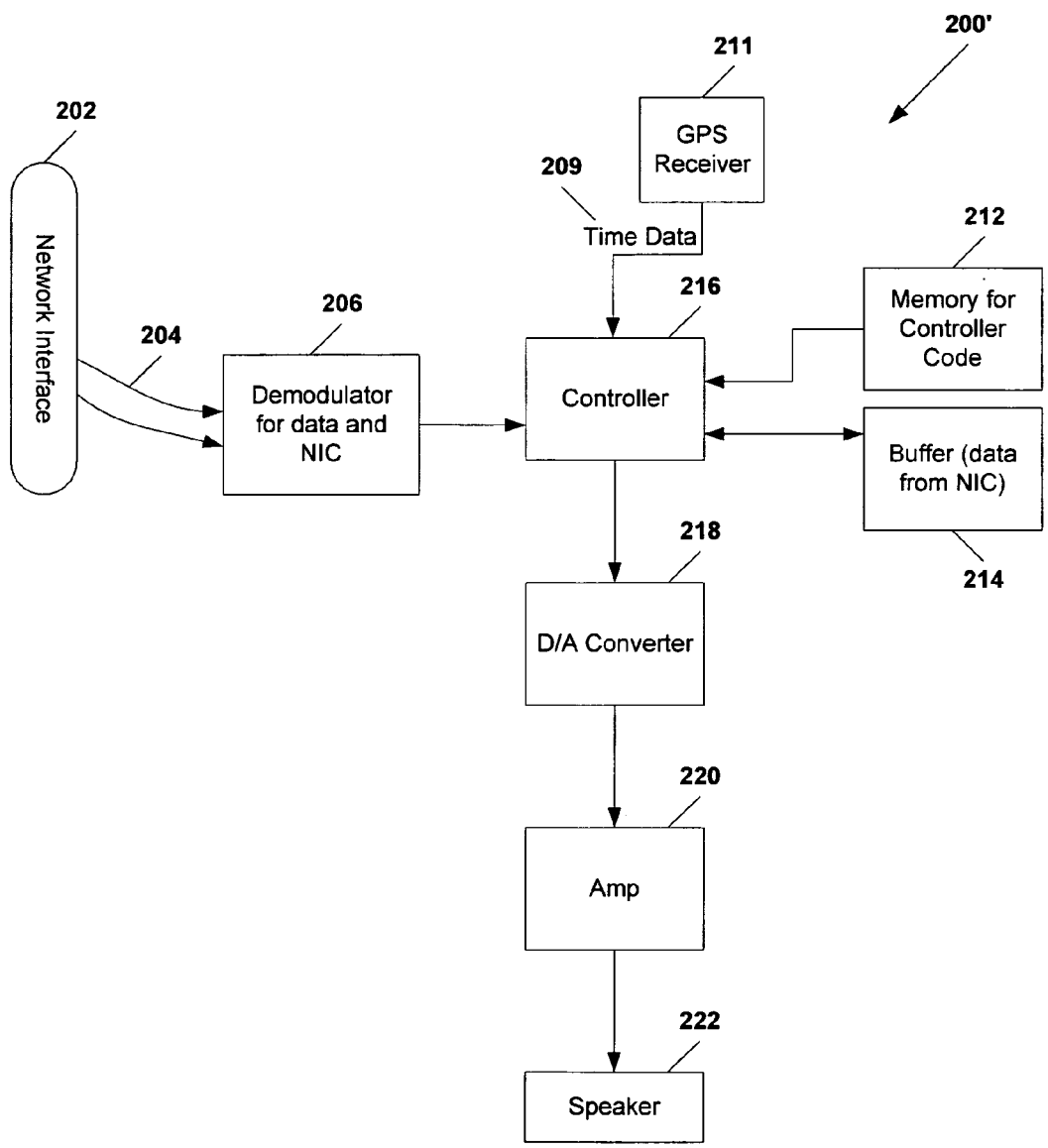
FIG. 2B illustrates a block diagram of an alternate embodiment of the destination device of FIG. 2A with a Global Positioning Satellite receiver.

As shown in FIG. 2B, the GPS receiver 211 provides time data 209 to controller 216. The time data 209 is the out-of-band signal for this particular embodiment. According to one implementation, when a single satellite receiver is used, an inexpensive receiver may be utilized so as to minimize the costs of the playback destination device 200'. While controller 216 receives time data 209 from receiver 211, controller 216 also receives decoded information in the nature of the time sequence number from the demodulator/NIC 206. In general, the information received by controller 216 from demodulator/NIC 206 is a standard data frame, and not an out-of-band signal.

Network interface 202 is representative of a variety of embodiments. For example, one embodiment of the present invention is implemented with a HomePNA NIC attached to a telephone receptacle at network interface 202, and another embodiment is implemented with and Ethernet NIC coupled to an Ethernet port at network interface 202. Once data is demodulated through a selected NIC 206, it is placed in a buffer 214. Modulated time synchronization signals with the time sequence number contained therein are received from network 120 through connection 202 and forwarded to demodulator 208. The demodulated time synchronization signals can then be used to adjust a local clock 210 as in FIG. 2A. Alternatively, demodulator 208 can feed the demodulated time synchronization signals to controller 216, which in turn invokes the adjustment of the local clock 210. The controller 216 in one embodiment executes the software stored in the memory 212, and uses the demodulated time synchronization signals to determine when to playback certain data contained in buffer 214. Those of ordinary skill in the art will readily recognize that controller 216 and memory 212 (e.g., a read-only-memory) are enabled to decode the data received so as to interpret the protocol used to transfer the content (e.g., audio, MP3, raw PCM samples that can be embodied in TCP/IP frames) over the demodulator and NIC 206. Furthermore, memory 212 contains instructions for feeding content into the controller 216 and D/A converter 218 (CODAC) so that data is played by speaker 222, and instructions, like for example, to adjust sound volume. Generally, controller 216 plays the data from buffer 214 according to signals received from local clock 210. This means that the controller 216 forwards the data from buffer 214 to D/A converter 218, amplifier 220, and speaker 222.

Figure 3:
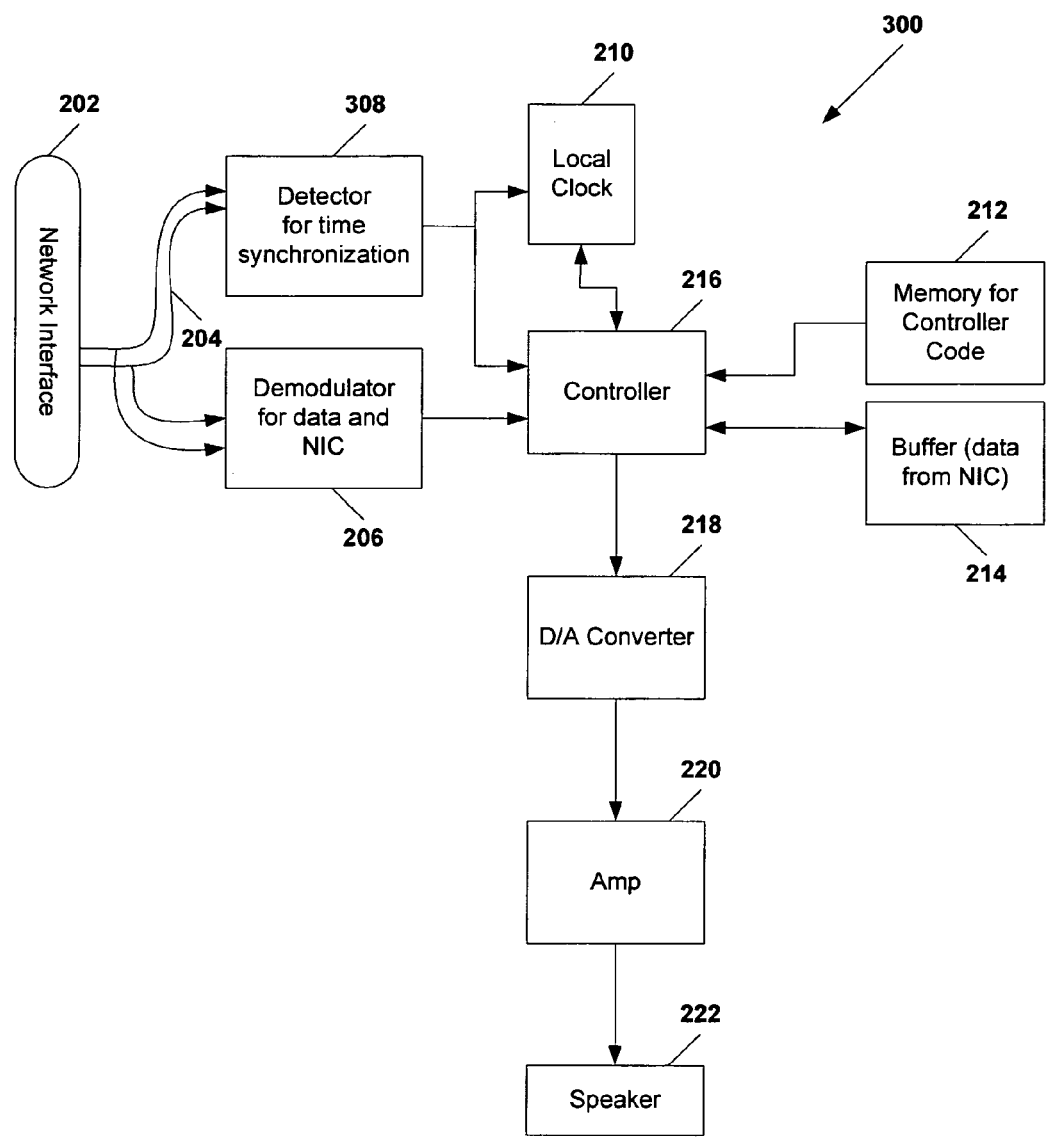
FIG. 3 illustrates a block diagram for an alternative embodiment of the destination device of FIG. 2A.

FIG. 3 illustrates a block diagram of an alternative embodiment of a destination device 300 in accordance with the present invention. The destination device 300 as shown is a network speaker connected to other network devices by network interface 202 (e.g., a wall receptacle, if the network wiring is through the power line). The line 204 transmits: the data received from network 120 to a demodulator and NIC 206; and time synchronization signals to a detector 308. In the alternative embodiment shown, the time synchronization signals received from network 120 are un-modulated, so detector 308 determines whether the time synchronization signal is received at the proper frequency. For example, detector 308 may simply perform a Fast Fourier Process (FFP) on the time synchronization signals. In this embodiment, the sequence number is extracted through the demodulator and NIC 206. The time synchronization signals are received at a detector 308 and then input to a local clock 210 and a controller 216. Alternatively, a global positioning satellite (GPS) receiver 211 can be substituted for the local clock 210 as a source of time data for the controller 216. The resulting arrangement using GPS receiver 211 would be similar to the embodiment previously described in FIG. 2B The controller 216 also receives the demodulated data from the demodulator and NIC 206. The controller 216 accesses a memory 212 with the controller instruction code, and a buffer for the data produced by the demodulator and NIC 206. The controller 216 outputs multimedia data (e.g., audio data, video data, and so forth) to a D/A converter 218, which produces an input for an amplifier 220 to send to a speaker 222.

Figure 4:
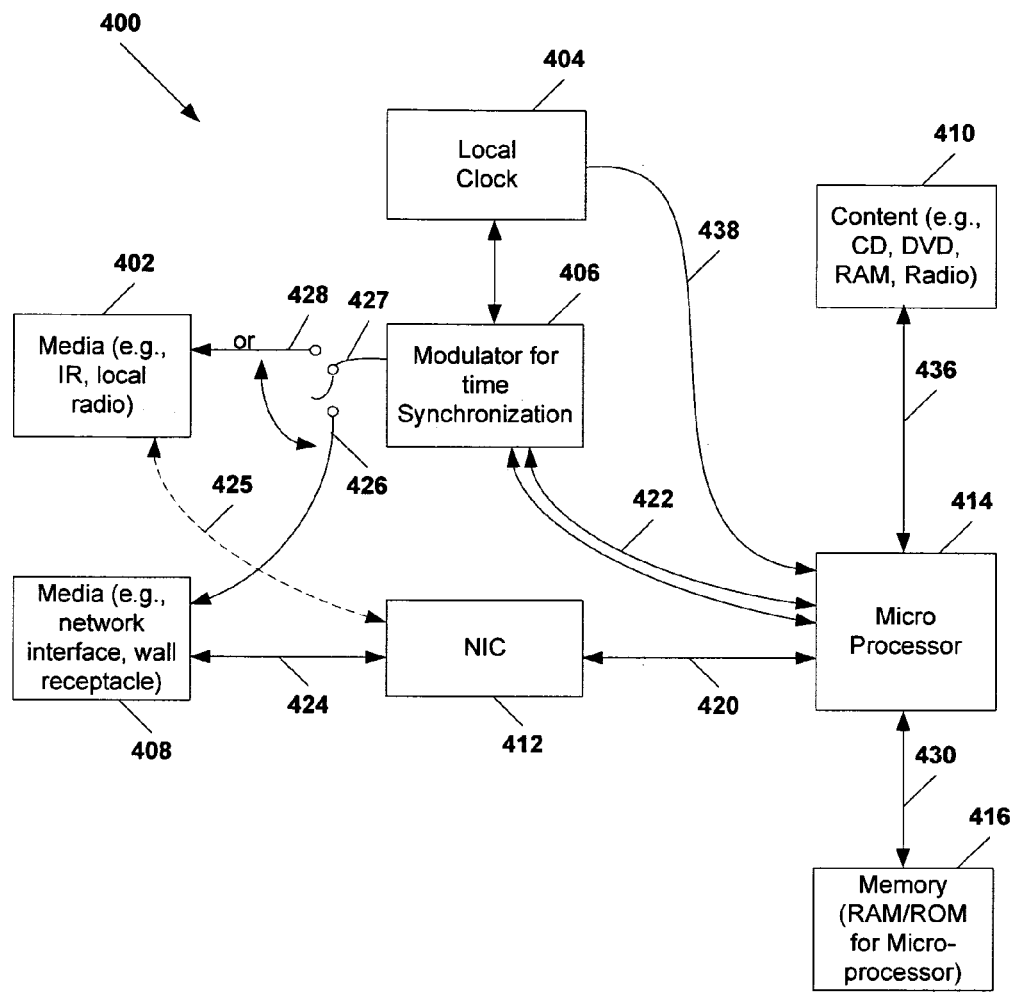
FIG. 4 illustrates a block diagram for one embodiment of a source device in accordance with the present invention.

FIG. 4 illustrates a block diagram of one embodiment of a source device 140 in the nature of an audio transmitter controller 400. In the embodiment shown, a time synchronization modulator 406 is connected by media 408 (e.g., network wiring, or a wall receptacle, if the network wiring is through the power lines) to network 120 by link 426. The time synchronization signals can be synchronized with the output of a local clock 404. The output of the modulator 406 and the local clock 404 are available to a microprocessor 414 over links 422 and 438, respectively. The microprocessor 414 accesses a memory 416 with the microprocessor instruction code through link 430. The instruction code is used to determine the content fetched from memory 410. If the data is to be transmitted from the controller 400 to network 120, microprocessor 414 transfers the data to be modulated in NIC 412 and on to media 408. Media 408 is communicatively coupled to modulator 406 via link 427. By doing so, modulated time synchronization signals are transmitted from modulator 406 through media 408 onto network 120. With this described embodiment, media 408 can be embodied as a power line.

In an alternative embodiment, transmission from controller 400 is by means other than network 120, such as by a wireless network (discussed below). In this alternative embodiment, link 427 couples media 402 with modulator 406 to enable the modulated time synchronization signals to be transmitted. A source of content is provided through link 436 from module 410. In the embodiment shown, module 410 can represent a variety of sources of content, including CD-ROMs, DVDs, RAM, radio, and connections to other networks including the Internet. Generally, content is fed from module 410 through microprocessor 414, and is modulated by modulator 406. Dotted line 425 indicates a connection for enabling the transfer of modulated data through media 402 with corresponding formatting as needed.

The present invention may be modified to work suitably well with wireless networks that transmit the synchronization pulses and data on different media than the home network. The synchronization pulses and data could be transmitted via infrared (IR). This would likely be more cost-effective than transmitting in a different band on the home network. However, the use of IR requires direct lines of sight between the networked speakers and the audio controller. Furthermore, IR remote controls could interfere with the IR synchronization signal, or the synchronization signal could interfere with systems controlled by the IR remote. Alternative preferred embodiments use radio-frequency (RF) transmissions to transmit the synchronization pulse. This solves the problems the IR embodiments have with line-of-sight restrictions. However, a radio-frequency embodiment is likely to be more expensive than an IR embodiment. Furthermore, the selection of a RF band with minimal interference would need to be selected, and the use of that RF band would also have to be allowed by the Federal Communications Commission (FCC), especially for use in consumer electronic devices.

Figure 5:
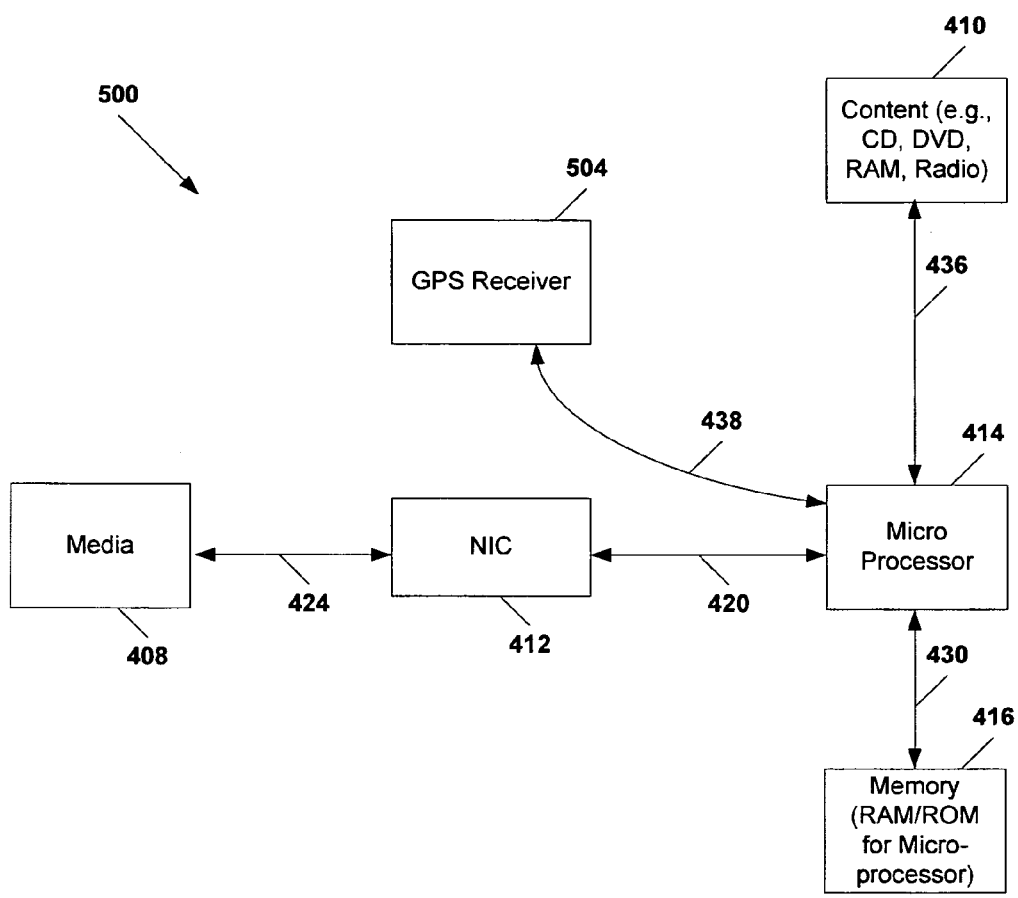
FIG. 5 illustrates a block diagram for an alternative embodiment of the source device of FIG. 4.

FIG. 5 illustrates a block diagram for an alternative embodiment of a controller device 500 used as a source device 140. Selected component blocks of FIG. 4 are included in FIG. 5, primarily for convenience. However, in the embodiment of FIG. 5, a global positioning satellite (GPS) receiver 504 is included to provide accurate time synchronization. In general, a GPS receiver 504 receives via satellite a time measurement that is very accurate (e.g., accurate at a microsecond resolution). As shown in FIG. 2B, a GPS receiver 211 should also be included in the networked speakers. GPS receivers 211 and 504 are then adapted to listen to and receive time signals from a satellite, and as will become apparent from the discussion to follow, thereby enables time synchronization to be more accurate than by using a local clock 210, 404. Instead of producing a sequence number in the data packet to indicate to a networked speaker when to play particular audio content, in the embodiment of FIG. 5, a GPS timestamp generated from the GPS receiver 504 can be sent to the device of FIG. 2B. That is, data sent by device 500 to a network device 200' includes a GPS timestamp of when to play particular content. Having received the data packet, a networked speaker extracts the timestamp, which would indicate when the speaker should be playing particular content, which is either stored in the speaker buffer or is due to arrive at the networked speaker. With this alternative embodiment of FIG. 5, a clock is not provided by the system, but by a third party resource (e.g., via satellite).

Figure 6:
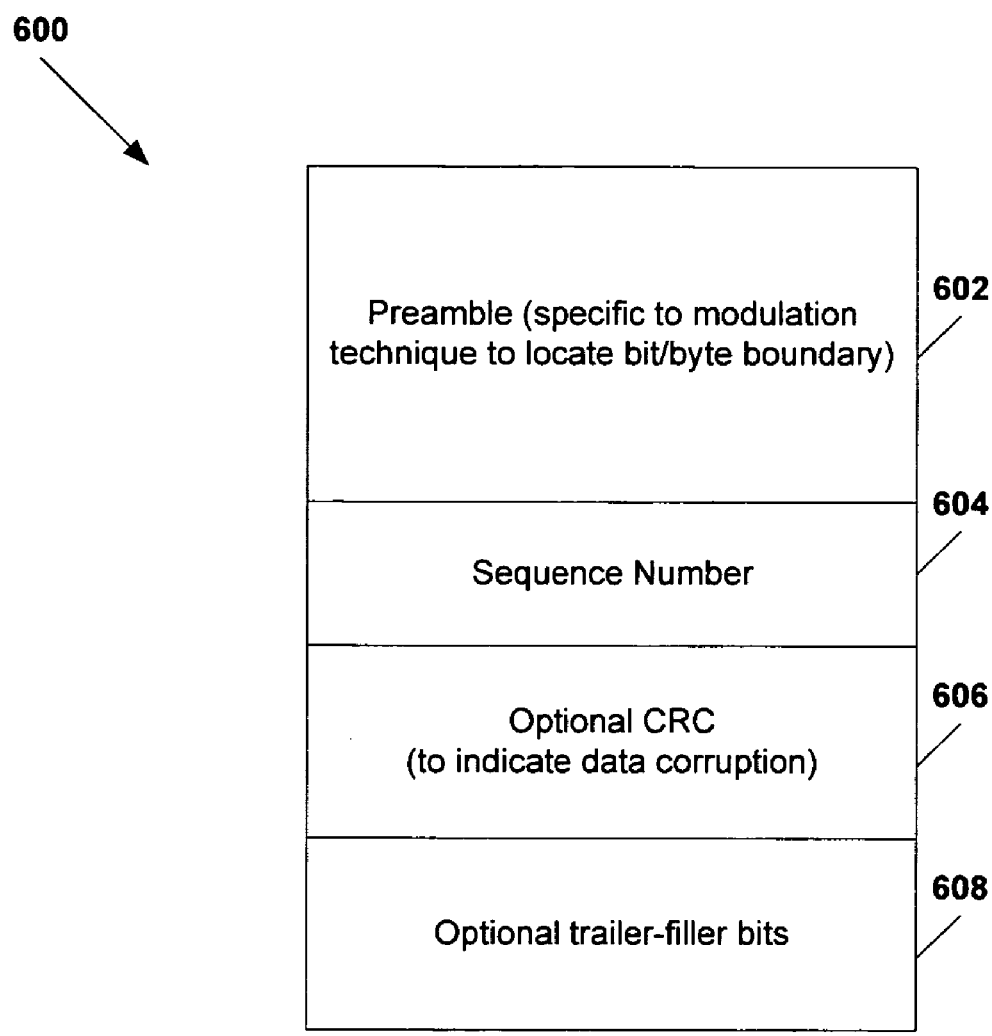
FIG. 6 illustrates an embodiment of a data packet transmitted from a source device to a destination device in accordance with the present invention.

FIG. 6 illustrates an example for implementing a data packet 600 transmitted from a source device (e.g., controller 140) to a destination device (e.g., network speaker $150_{0-n}$) in accordance with the present invention. The data packet 600 includes a pre-amble 602 generally representing specific information concerning the modulation technique. For example, this information may include the location of the bit boundaries for performing modulation. Data packet 600 also includes a sequence number 604 indicating a point of reference for when a networked speaker should play particular content transmitted from the controller. Also data packet 600 may optionally include a bit field 606 for error checking. For example, bit field 606 may represent a cyclic redundancy code (CRC) to detect bit errors from data corruption. Also, data packet 600 may include an optional bit field 608 with trailer or filler bits.

Figure 7:
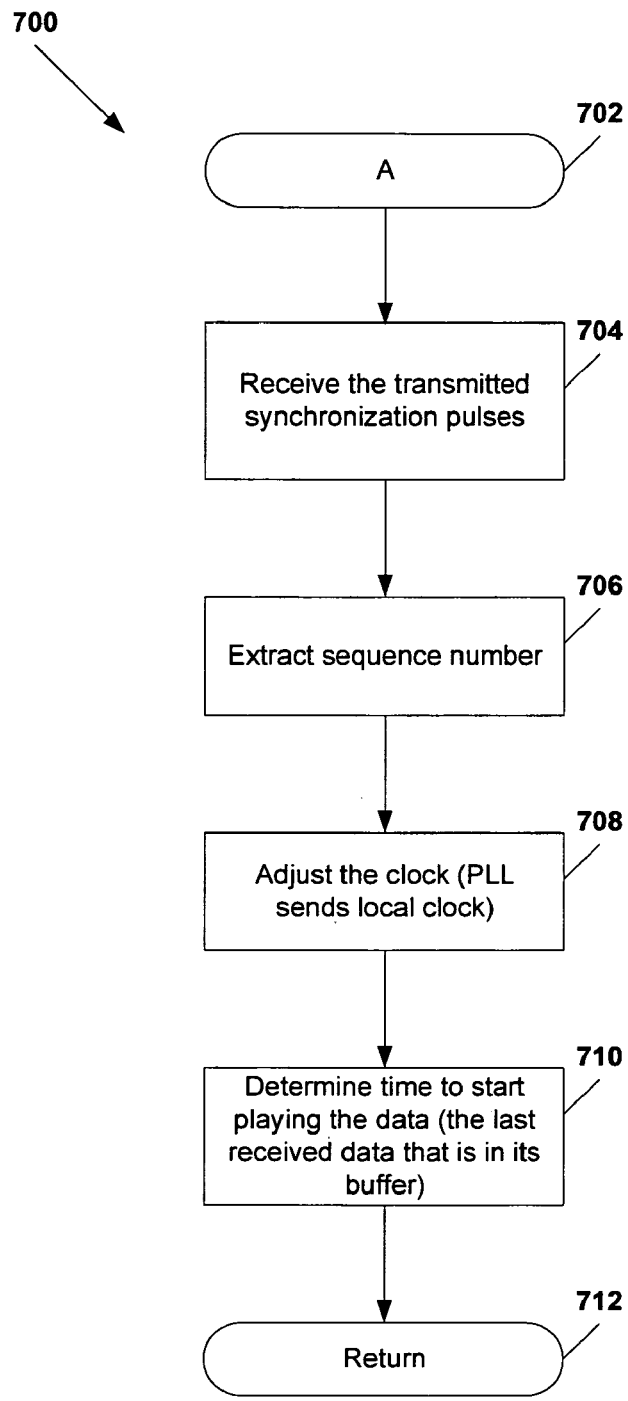
FIG. 7 illustrates a flowchart of one embodiment for operating a destination device in accordance with the present invention.

FIG. 7 illustrates a flowchart of one embodiment of a method in accordance with the present invention for operating a destination device $150_{0-n}$, for example, networked speakers. The method begins in operation 702, and is followed by operation 704, where the destination device receives the broadcast synchronization pulses, either via network 120 or by some other media previously discussed with reference to 402. Operation 706 is next, where the destination device extracts the sequence number from the synchronization pulses. Operation 708 is performed, where the destination device is adjusted to the time indicated by a local clock 210. As discussed, the source of timing clock signals can comprise a local clock 210 which may be a PLL, or alternatively, a GPS receiver 211. Operation 710 is initiated, where the destination device determines when to start playing the data received by the destination device and stored in data buffer 214. The method concludes at operation 712.

Figure 8:
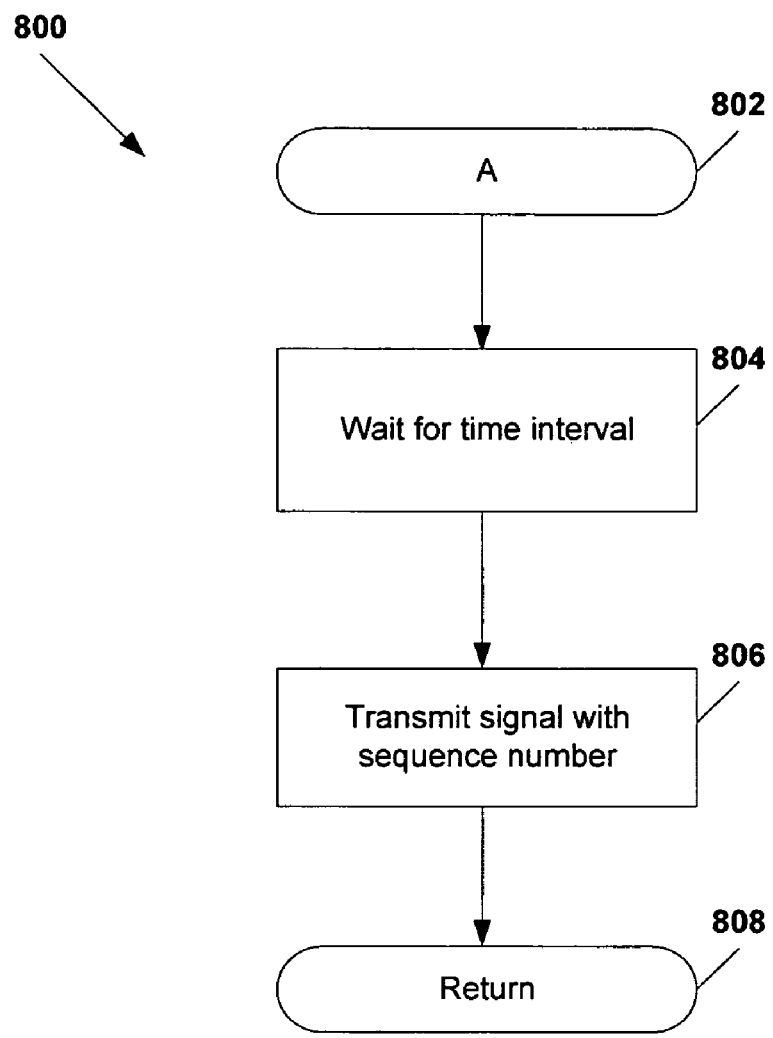
FIG. 8 illustrates a flowchart of one preferred embodiment of the invention for operating a source device in accordance with the present invention.

FIG. 8 illustrates a flowchart of one preferred embodiment of the invention in operating a source device in accordance with the present invention. The method begins in operation 802, and is followed by operation 804, where the source device waits for a pre-determined time interval ranging from less than a millisecond to tens of milliseconds. Operation 806 is next, where the source device transmits a time synchronization signal containing a sequence number to the destination devices. Alternatively, in operation 806 the source device can transmit a time synchronization signal that does not contain a sequence number. This will avoid the complexity and time delay of using an additional modulator in the source device and an additional demodulator in the destination device.

The described embodiment of the present invention that uses the power line wiring inside the home or building is beneficial because it provides a great deal of flexibility. For example, not only can any network device distribute real-time continuous digital media streams (and possibly asynchronous data) to any other network device, but such devices (including legacy devices connected via an adapter, as well as new "digital-ready" devices) can exhibit functionality not feasible with most conventional technologies. However, in alternative embodiments, the network connection may be implemented on a different type of connection than the standard residential unshielded wiring. Category 3 or Category 5 unshielded twisted pair wiring, or even coaxial or fiber optic cable, may be installed in order to support higher-speed signal propagation, and/or provide increased cable lengths and/or network bandwidth. It should be noted that, using standard wiring, the total distance between network devices along the network path has a practical limitation due to signal attenuation. This limitation will depend on the gauge and quality of the wire.

Additional details about the synchronization signal transmitted by the audio controller (see FIG. 1) and received by the networked speakers $150_{0-n}$ are now discussed. In one example, the synchronization signal is a short, modulated pulse with modulated data containing a sequence number. Almost any modulation can be used (e.g., QAM, ODFM, CODFM, DFM, PSK, BPSK, QPSK, and so forth, discussed below in more detail). The modulation used can be selected for simplicity of implementation. Preferably, the modulation is the same modulation as the network data modulation, if that allows sharing of hardware and software. The synchronization pulses are transmitted at regular intervals by the audio controller 140, and each pulse has a sequence number that is incremented at transmission time. In the embodiment where devices 150 are network speakers, each network speaker adjusts its local clock using a phase-locked-loop (PLL) driven by the synchronization pulse.

According to an aspect of the present invention, since the synchronization pulses are not transmitted in the same band as the network data, they are not subject to network latency variations. Some common network protocols cause network latency variations. For example, Carrier Sense Multiple Access/Collision Detection (CSMA/CD) is a network protocol determining how network devices respond when two devices attempt to use a data channel simultaneously (i.e., called a collision). CSMA/CD enables devices to detect a collision, but after detecting a collision, a device waits a random delay time and then attempts to re-transmit the message. Since standard Ethernet networks use CSMA/CD, such network latency variations are common. Network latency variations can also occur in token passing systems from delays waiting for the token to be available, and in automatic repeat request/linked automatic repeat request (ARQ/LARQ) systems from the variability in data transmission times.

In the described embodiments, the audio data packets transmitted on the data network would also include a sequence number. This sequence number corresponds with a synchronization pulse having the same sequence number indicating when the audio data should be played. When controller 216 associates the sequence numbers for the data and the time synchronization, the present invention allows a network speaker 150$_{0-n}$, to quickly determine when to start playing audio data. One aspect of the present invention enables the transmitter power to be increased for each pulse without increasing the average transmitter power by using a periodic synchronization pulse, instead of a continuous synchronization signal. Periodic synchronization pulses make it easier to obtain Federal Communication Commission (FCC) certification of the device. Preferably, the timing of the synchronization pulses is selected to minimize the cost of the PLL hardware in the network speakers, because longer time intervals between synchronization pulses require more complex and costlier PLL hardware.

As mentioned, the described embodiments of the present invention can support virtually any transmission media, including wireless configurations. For example, one or more wiring segments between two devices may be replaced with a bi-directional wireless link (e.g., RF, IR, optical, ultrasonic, or equivalents). By employing wireless transceivers at the two endpoints of a chain of devices having bi-directional transceivers, a network could be constructed with the wireless link serving to complete the network path.

The various types of modulation techniques well-suited for use with the present invention will now be discussed in detail. One example of a wireless communication link is based on quadrature amplitude modulation (QAM). Alternatively, simpler embodiments could use phase shift keying (PSK) modulation, which is very robust and easy to implement with low data rates. In PSK modulation, the shape of the wave is modified in neither amplitude nor frequency, but rather in phase. The phase can be considered a shift in time.

In binary phase shift keying (BPSK) modulation, the phases for the sine wave start at either 0 or ¼. In BPSK modulation, only one bit is transmitted per cycle (called a symbol). In more complex modulation schemes, more than one bit is transmitted per symbol. Quadrature phase shift keying (QPSK) modulation is similar to the BPSK modulation. However, instead of only two separate phase states, QPSK modulation uses four (0, ½ ¼, ¼, and ⅜ ¼), carrying two bits per symbol. Like BPSK modulation, QPSK modulation is an alternative for implementing preferred embodiments, because of its robustness. However, since it only modulates two bits per symbol, it still is not very efficient for high-speed communications. Hence, higher bit rates require the use of significant bandwidth.

Even though QPSK modulation uses no state changes in amplitude, it is sometimes referred to as 4-QAM modulation. When four levels of amplitude are combined with the four levels of phase, this is called 16-QAM modulation. In 16-QAM modulation, two bits are encoded on phase changes and two bits are encoded on amplitude changes, yielding a total of four bits per symbol. Preferably, the network selected can support Digital Video Broadcast (DVB), QPSK, and QAM 16, 32, 64, 128 and 256 modulation schemes. The QAM modulation is used in MMDS and CATV applications where there is a need to modulate an MPEG2 bit stream onto an RF carrier for MMDS transmission or on a CATV system.

In a standard frequency division multiplexing (FDM) modulation system, channels (or carriers) are spaced so they don't overlap (i.e., the channels are separated by guard bands that allow conventional filters and demodulators to recover the data). Other embodiments of the present invention use orthogonal frequency division multiplexing (OFDM) modulation, where the N data streams are transmitted in parallel. By appropriately choosing the frequency spacing between data streams, the data streams can be made orthogonal (i.e., completely separated). The frequency spectrum of the sub-carriers actually overlaps to some degree, which means that more information can be transmitted in a fixed bandwidth than with conventional FDM modulation.

OFDM modulation spreads the data to be transmitted over a large number of carriers; typically the number of carriers is more than a thousand. The data rate to be conveyed by each of these carriers is correspondingly reduced. It follows that the symbol length is in turn extended. These modulation symbols on each of the carriers are arranged to occur simultaneously. The carriers have a common, precisely chosen frequency spacing. This is the inverse of the duration, called the active symbol period, over which the receiver will examine the signal, performing the equivalent of an 'integrate-and-dump' demodulation. This choice of carrier spacing ensures orthogonality (the 'O' of OFDM modulation) of the carriers. Therefore, the demodulator for one carrier does not 'see' the modulation of the others, so there is no cross talk between carriers, even though there is no explicit filtering and their spectra overlap. Another embodiment that is potentially less sensitive to multi-path transmission problems uses coded orthogonal frequency division multiplexing (COFDM) modulation.

Generally, the present invention enables sufficient network synchronization for digital media transmission on a network. Moreover, the described embodiments of the invention can operate throughout a home, office, or other environment. The present invention is well-suited to work with a variety of types of media and data, such as: (1) nearly any type of digital audio including AC-3 (digital surround sound) and high sample rate formats such as DVD audio; (2) MPEG1 and MPEG2 video, including DVD video and HDTV (high-definition television signals which can require up to 19.2 Mbps); (3) voice telephony, FAX signals, or ISDN lines which are encoded as low data rate digital audio; (4) TCP/IP (i.e., Internet) data; and (5) other standard data formats including RS-232, MIDI, CE IR, IrDA, and X-10. The described embodiments of the present invention provide elegant and easy-to-install systems with a wide variety of applications, such as: (1) whole-house media distribution and networking; (2) home theater interconnection; (3) audio component interconnection; (4) home control and automation; (5) home PC networking; and (6) in-vehicle media distribution.

While the invention has been described in conjunction with the described embodiments, it is evident that many alternatives, modifications, and variations will be apparent to those skilled in the art in light of the foregoing description. Accordingly, the disclosure of the present invention is intended to be illustrative, but not limiting, of the scope of the invention, which is set forth in the following claims.

What is claimed is:

1. A method to synchronize transmission of data, said method comprising:

receiving a plurality of data into a buffer at a destination device, wherein the plurality of data is transmitted by a first source device via a first network;

receiving a plurality of synchronization pulses at said destination device, wherein the plurality of synchronization pulse is transmitted by a second source device via a second network; and receiving a sequence number at said destination device to determine when said destination device will access said plurality of data from said buffer.

2. The method of claim 1, further comprising extracting the sequence number from said plurality of synchronization pulses received by said destination device to determine when and in which order said destination device will access said plurality of data from said buffer.

3. The method of claim 1, wherein the first network is a power line network and the second network is a data network.

4. The method of claim 1, wherein said first source device and said second source device are the same device.

5. The method of claim 1, wherein said plurality of synchronization pulses adjusts a clock signal used by said destination device.

6. The method of claim 5, wherein said plurality of synchronization pulses adjusts a phase-locked-loop (PLL) in said destination device.

7. The method of claim 1, wherein said plurality of synchronization pulses is transmitted to said destination device by a transmission media selected from a group consisting of: a pair of wires, a double pair of wires, a coaxial cable, radio transmission, infrared transmission, one optical fiber, and two optical fibers.

8. The method of claim 1, wherein said plurality of synchronization pulses and said plurality of data are transmitted using one modulation method.

9. The method of claim 8, wherein said plurality of synchronization pulses and said plurality of data are transmitted using orthogonal differential frequency (ODFM) modulation.

10. The method of claim 8, wherein said plurality of synchronization pulses and said plurality of data are transmitted using a modulation method selected from a group of modulation methods consisting of: QAM, CODFM, DFM, PSK, BPSK, or QPSK.

11. The method of claim 1, wherein said plurality of synchronization pulses is transmitted with a different modulation from a modulation used to transmit said plurality of data.

12. The method of claim 1, wherein said plurality of synchronization pulses is transmitted without modulation.

13. The method of claim 1, wherein said plurality of data has an embedded sequence number.

14. The method of claim 1, further comprising receiving said plurality of synchronization pulses by a global positioning satellite (GPS) receiver in said destination device.

15. The method of claim 1, wherein said plurality of data includes audio data, video data, multimedia data, or a combination thereof.

16. A method to transmit data, said method comprising:
transmitting a plurality of data from a first source device into a buffer at a destination device via a first network;
wherein the destination device receives a plurality of synchronization pulses from a second source device via a second network;
wherein said plurality of synchronization pulses adjusts a local clock in said destination device; and
wherein the destination device extracts a sequence number from said plurality of synchronization pulses to determine when and in which order to access said plurality of data from said buffer.

17. The method of claim 16, wherein the first network is a power line network and the second network is a wireless network.

18. The method of claim 16, wherein said first source device and said second source device are the same device.

19. The method of claim 16, wherein said plurality of synchronization pulses and said plurality of data are transmitted using one modulation method.

20. The method of claim 16, wherein said plurality of synchronization pulses is transmitted with a different modulation from a modulation used to trait said plurality of data.

21. The method of claim 16, wherein said plurality of synchronization pulses is transmitted without modulation.

22. The method of claim 16, wherein said plurality of data has an embedded sequence number, which said destination device can extract to determine when to access said plurality of data from said buffer.

23. A data system, comprising:
a destination device having a buffer and a controller, wherein the destination device receives a plurality of data from a first source device to be stored in the buffer and receives a plurality of synchronization pulses from a second source device that is physically separate from the first source device;
wherein the controller is configured to calculate a sequence number to determine when the controller accesses the plurality of data from the buffer;
wherein the destination device is configured to receive the plurality of data from the first source device via a first transmission medium of a first network; and
wherein the destination device is configured to receive the synchronization pulses from the second source device via a second transmission medium of a second network.

24. The system of claim 23, wherein said destination device determines said sequence number from said plurality of synchronization pulses.

25. The system of claim 23, wherein said first transmission medium and said second transmission medium are the same transmission medium.

26. The system of claim 23, wherein said first source device and said destination device are connected in a network by a power line.

27. The system of claim 23, wherein said first source device and said second source device are the same device.

28. The system of claim 23, wherein said plurality of synchronization pulses adjusts a clock signal used by said destination device.

29. The system of claim 28, wherein said plurality of synchronization pulses adjusts a phase-locked-loop (PLL) in said destination device.

30. The system of claim 23, wherein said plurality of synchronization pulses is transmitted to said destination device by a transmission media selected from a group consisting of: a pair of wires, a double pair of wires, a coaxial cable, radio transmission, infrared transmission, one optical fiber, and two optical fibers.

31. The system of claim 23, wherein said plurality of synchronization pulses and said plurality of data are transmitted using the same modulation method.

32. The system of claim 31, wherein said plurality of synchronization pulses and said plurality of multimedia data are transmitted using orthogonal differential frequency (ODFM) modulation.

33. The system of claim 31, wherein said plurality of synchronization pulses and said plurality of multimedia data are transmitted using a modulation method selected from a group of modulation methods consisting of: QAM, CODFM, DFM, PSK, BPSK, or QPSK.

34. The system of claim 23, wherein said plurality of synchronization pulses is transmitted with a different modulation from a modulation used to transmit said plurality of data.

35. The system of claim 23, wherein said plurality of synchronization pulses is transmitted without modulation.

36. The system of claim 23, wherein said plurality of data has an embedded sequence number.

37. The system of claim 23, wherein said destination device comprises a global positioning satellite (GPS) receiver receiving said plurality of synchronization pulses.

38. The system of claim 23, further comprising an error detection circuit in said destination device.

39. The system of claim 23, wherein said plurality of data includes audio data.

40. The system of claim 23, wherein said plurality of data includes video data.

41. The system of claim 23, wherein said first source device comprises a first audio controller and said second source device comprise a second audio controller, and said destination device comprises one or more speakers.

42. The system of claim 23, wherein said destination device further includes one or more demodulators demodulating said plurality of data and said plurality of synchronization pulses.

43. The system of claim 23, wherein said destination device further includes a detector extracting said sequence number from said plurality of synchronization pulses.

44. A computer-implemented method for synchronizing transmission of data, the method comprising:

receiving a plurality of data transmitted from a source device via a first network;

subsequently receiving a plurality of synchronization pulses transmitted from said source via a second network;

adjusting a clock local to each of one or more destination devices in response to said plurality of synchronization pulses;

extracting a sequence number from said plurality of synchronization pulses; and invoking each of said one or more destination devices to access said plurality of data according to said sequence number.

45. A computer program product for synchronizing transmission of data, wherein said computer program product is stored on a computer readable medium and adapted to perform operations of:

receiving a plurality of data transmitted from a source device via a first network;

subsequently receiving a plurality of synchronization pulses transmitted from said source device via a second network;

adjusting a clock local to each of one or more destination devices in response to said plurality of synchronization pulses;

extracting a sequence number from said plurality of synchronization pulses; and invoking each of said one or more destination devices to access said plurality of data according to said sequence number.

46. The computer program product of claim 45, wherein at least one of said one or more destination devices comprises a phase-locked-loop (PLL) and said plurality of synchronization pulses adjusts said PLL.

47. The computer program product of claim 45, wherein said plurality of data is selected from a group consisting of audio data, visual data, multimedia data, or a combination thereof.

48. The method of claim 1, wherein the first network is a wireless network and the second network is a power line network.

49. The method of claim 1, wherein said first source device and said second source device are physically separate devices.

50. The method of claim 3, wherein the data network is a wireless network.

51. The method of claim 16, wherein the first network is a wireless network and the second network is a power line network.

* * * * *